United States Patent
Fasold et al.

(10) Patent No.: US 8,968,945 B2
(45) Date of Patent: Mar. 3, 2015

(54) HUMIDIFIER FOR A FUEL CELL

(71) Applicant: Mann+Hummel GmbH, Ludwigsburg (DE)

(72) Inventors: Michael Fasold, Auenwald (DE); Marcel Mayer, Stuttgart (DE)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/658,537

(22) Filed: Oct. 23, 2012

(65) Prior Publication Data
US 2013/0101909 A1    Apr. 25, 2013

(30) Foreign Application Priority Data
Oct. 24, 2011  (DE) .......................... 10 2011 116 697

(51) Int. Cl.
*H01M 8/06* (2006.01)
*B01D 63/08* (2006.01)
*B01D 65/00* (2006.01)
*B01D 69/00* (2006.01)
*H01M 8/04* (2006.01)
*B01D 53/22* (2006.01)

(52) U.S. Cl.
CPC ............ *B01D 63/085* (2013.01); *B01D 65/003* (2013.01); *B01D 69/00* (2013.01); *H01M 8/04149* (2013.01); *B01D 2053/222* (2013.01); *B01D 2313/04* (2013.01); *Y02E 60/50* (2013.01)

USPC .......................................................... 429/413

(58) Field of Classification Search
None
See application file for complete search history.

(56) References Cited

U.S. PATENT DOCUMENTS

| | | | |
|---|---|---|---|
| 7,404,848 B2 | 7/2008 | Okada et al. | |
| 2008/0085437 A1 | 4/2008 | Dean et al. | |
| 2008/0178182 A1 | 7/2008 | Yamashima et al. | |
| 2008/0182149 A1* | 7/2008 | Zhang et al. | 429/34 |
| 2009/0108476 A1 | 4/2009 | Eping et al. | |
| 2010/0193975 A1 | 8/2010 | Kammann et al. | |
| 2011/0039167 A1* | 2/2011 | Zhang et al. | 429/413 |
| 2012/0181712 A1* | 7/2012 | Vanderwees et al. | 261/102 |
| 2012/0217661 A1* | 8/2012 | Brenner et al. | 261/104 |

FOREIGN PATENT DOCUMENTS

| | | |
|---|---|---|
| DE | 102009034095 A1 | 3/2010 |
| WO | WO2007020107 A1 | 2/2007 |
| WO | WO2009036872 A2 | 3/2009 |

\* cited by examiner

*Primary Examiner* — Patrick Ryan
*Assistant Examiner* — Jose Colucci Rios
(74) *Attorney, Agent, or Firm* — James Hasselbeck

(57) ABSTRACT

A humidifier for a fuel cell has a stacked unit of several water-permeable membranes which are parallel to each other and are arranged spaced apart form each other. On the edges of the membranes, a sealant is applied which closes a flow space between neighboring membranes fluid-tightly and serves as a spacer.

15 Claims, 6 Drawing Sheets

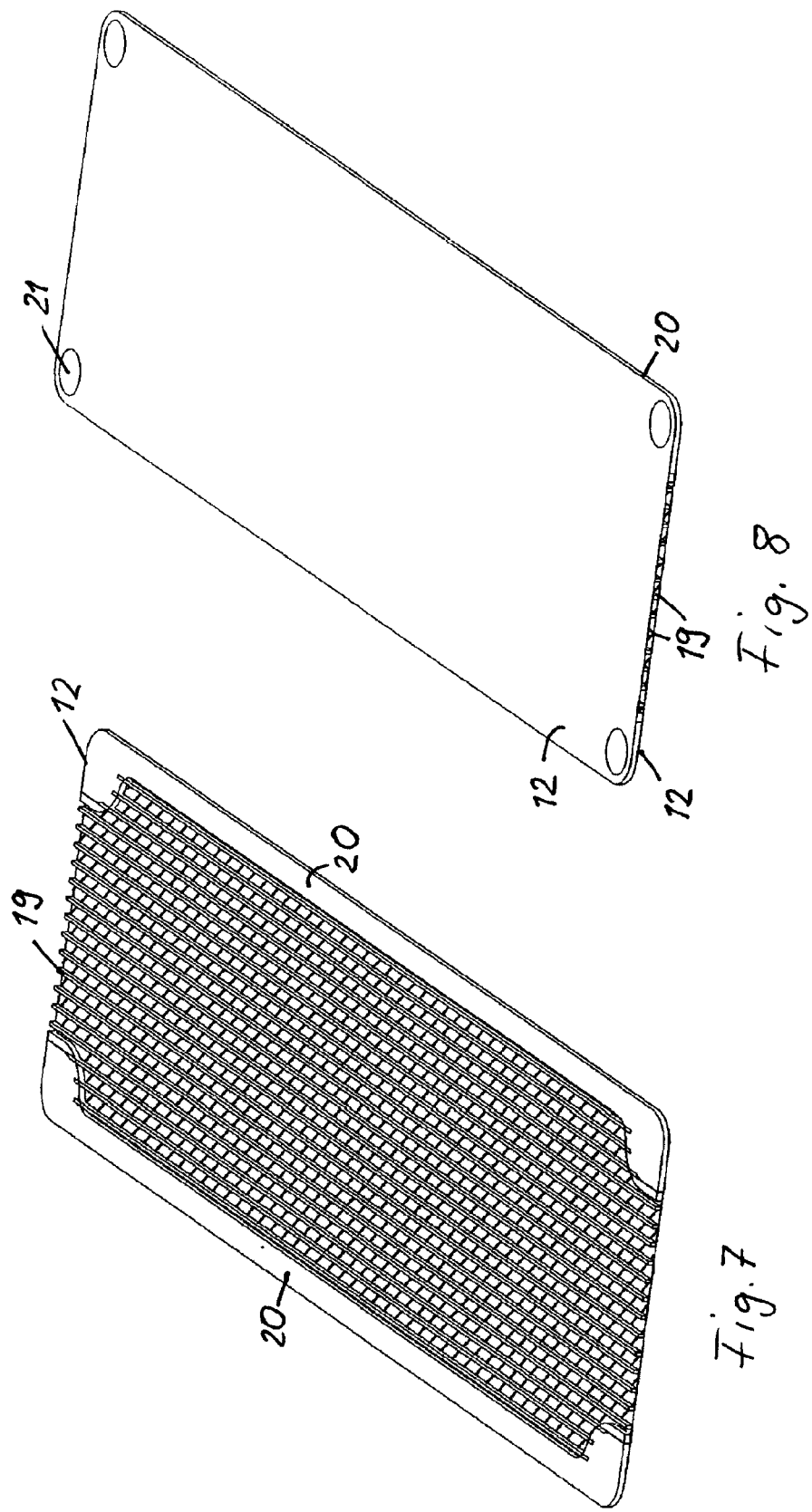

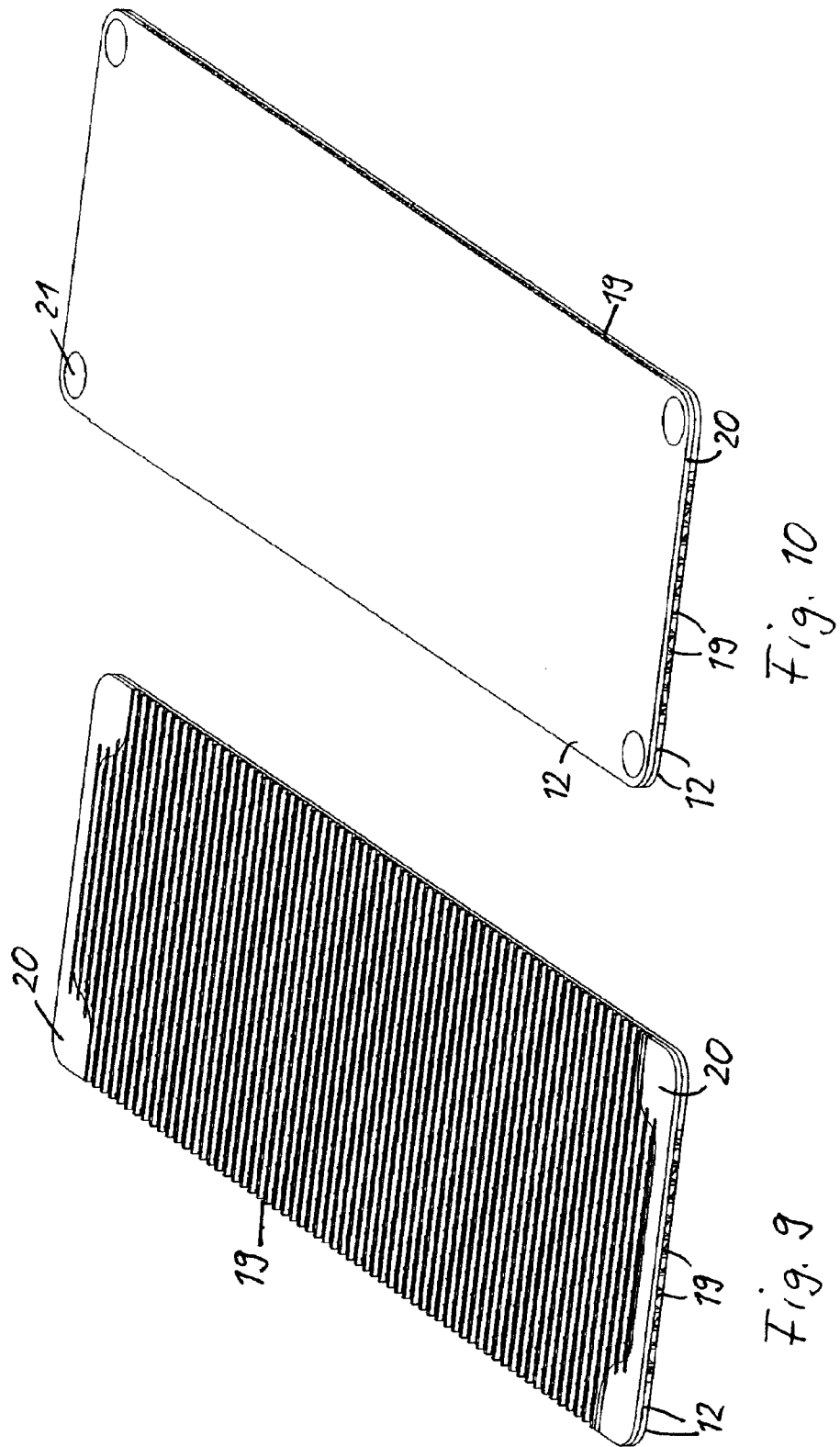

HUMIDIFIER FOR A FUEL CELL

CROSS-REFERENCE TO RELATED APPLICATIONS

This application claims the benefit of German patent application No. 10 2011 116 697.5 filed in Germany on Oct. 24, 2011, the entire contents of which are incorporated by reference.

BACKGROUND OF THE INVENTION

The invention relates to a humidifier for a fuel cell with at least one stacked unit comprising several water-permeable membranes that are arranged parallel and spaced apart to each other.

EP 1 261 992 B1 discloses a humidifier for a fuel cell wherein the humidifier comprises a water-permeable membrane which separates two flow passages through which humid or dry air is passed. Water molecules from the flow of humid air penetrate through the membrane to the dry airflow which is thereby enriched with moisture. This airflow is supplied to a fuel cell system in which by an electrochemical reaction electric current is generated.

The membranes are clamped between two frame parts that are provided with flow openings for supplying or removing the airflows. Optionally, several membranes including the frame parts can be stacked to a stacked unit and the frame parts also serve as a spacer between successive membranes in this case.

SUMMARY OF THE INVENTION

The object of the present invention is to provide a humidifier of a simple configuration for a fuel cell.

This object is solved according to the invention in that at the edges of the membranes a sealant, forming part of the stacked unit, is arranged, wherein the sealant closes or seals a flow space between neighboring membranes in a fluid-tight way. The dependent claims provide expedient further embodiments.

The humidifier according to the invention serves to enrich the airflow supplied to a fuel cell for the electrochemical reaction with moisture until a required minimum moisture contents is reached in the airflow. For this purpose, the humidifier comprises a plurality of membranes that are arranged parallel to each other and spaced apart and each are water-permeable but not air-permeable so that by means of the membrane exclusively a water exchange from an airflow with higher moisture contents to an airflow with lower moisture contents takes place, the latter being supplied to the fuel cell. The stacked unit comprises at least two water-permeable membranes, preferably however more than two membranes, optionally several dozen membranes that are parallel and spaced apart relative to each other.

At the edges of the membranes, a sealant is arranged that closes off the flow space between the neighboring membranes fluid-tightly. The sealant is a component of the stacked unit so that the stacked unit with the membranes and the edge-side sealant forms a module that can be inserted into a housing of the humidifier and can be removed from the housing, when required. The sealant ensures the seal-tightness with respect to flow so that the interior (flow space) between the neighboring membranes is fluid-tightly closed at the side where the sealant is arranged.

The sealant can be a sealing material like rubber or a rubber-like material which is arranged in a manner ensuring the seal-tightness at the end face of the membrane. In addition, or alternatively, the sealant can be glued to the end faces by means of which a higher safety with respect to leakage airflows is provided. For example, an adhesive can be applied onto a sealing element and/or onto the edge area of the membrane so that the applied sealing element is glued to the membranes.

It is possible also that the sealant is embodied as an adhesive material which, without additional glue, forms an adhesive connection with the edge segments of the membranes. This has the advantage that additional means are not required for adhesion.

The sealant is embodied advantageously such that the sealant has a sufficiently high inherent stiffness in the mounted state and therefore can be bear forces that act within the stacked unit. This has the advantage that an additional frame for receiving and securing the membrane is not required. The sealant therefore also assumes the function of supporting and framing the membranes. The stacked unit forms in the cured state of the sealant a self-supporting unit.

It can be expedient to use, in particular when employing a sealant in the form of an adhesive material, a thixotropic medium for the sealant whose viscosity depends on the shear stress. This means that, for example, the thixotropic sealant is liquid when it is being stirred and, upon completion of stirring and application on the stacked unit, the viscosity increases until the sealant has the necessary Inherent stiffness and is capable of transmitting forces.

According to another expedient embodiment, two neighboring membranes are provided respectively in the area of opposite end faces with the sealant while the end faces positioned at a 90° angle thereto are free of sealant. This permits a continuous flow path parallel with the plane of the membranes wherein the flow path is limited at both sides by the sealant. Advantageously, in the stacked unit the sealant is arranged in the successively arranged membranes displaced by 90°, respectively, so that, in succession, parallel flow paths are produced that are displaced to each other by a 90° angle, respectively. The airflow loaded with high moisture contents is supplied via an end face to the stacked unit and passed through it; the dry airflow is supplied at a 90° angle to the moist airflow to the end face of the stacked unit and passed through it. The membranes separate the flow paths for the moist air and the dry air and permit, on account of their water-permeation property, water permeation from the airflow with higher moisture contents to the airflow with the lower moisture contents, the latter being supplied to the fuel cell after enrichment with moisture.

The air to be supplied to the fuel cell is preferably ambient air. The air loaded with moisture whose moisture is to be transferred to the dry airflow is preferably exhaust air of the fuel cell.

Basically, it is sufficient to arrange the sealant as a spacer between the immediately neighboring membranes so that additional spacers are not needed. However, according to another embodiment, it is expedient to provide such additional spacers between neighboring membranes in order to guarantee a sufficient and in particular constant distance between the membranes under all operating conditions. For example, the spacers are embodied as a spacer lattice which extends at least substantially across the surface area of the membrane. In this context, it can be expedient to use spacer lattices that are matched to the respective flow-through direction and comprise webs in longitudinal direction or transverse direction in order to guarantee or support individual flow passages or a preferred flow direction within the flow space between the membranes.

To improve application of the sealant, in particular of the adhesive material, to the membrane and in particular to improve a connection between the sealant and the membranes, it can be expedient to subject the edge area of the membrane to a treatment before applying the sealant, for example, to etch the edge area or to subject it to plasma treatment, corona or to apply a flame.

According to another expedient embodiment, the stacked unit is received in a housing sealing frame which is a component of the stacked unit or together with the stacked unit forms a cartridge that can be inserted into the housing of the humidifier. The housing sealing frame to be connected with the stacked unit comprises advantageously a housing cover that is to be placed onto the end face of the stacked membranes as well as two lateral housing wings so that the housing sealing frame is embodied as a whole so as to have approximately the shape of a U. Expediently, the housing wings can be bent outwardly at least about some degrees from their position angled by 90° relative to the cover, for example, in that the connecting area between the housing wings and the housing cover is formed like a film hinge or provided with cutouts or configured in any other suitable manner to enable bending. The outward bending of the housing wings facilitates and improves positioning of the housing sealing frame on the stacked unit with the membranes joined by the sealant.

Expediently, housing sealing frames with a housing cover and two housing wings are positioned onto the opposite end faces of the stacked unit, respectively. The housing wings of the housing sealing frames that are attached to opposite end faces of the stacked unit can overlap each other so that, by pressing the outwardly positioned housing wings inwardly, the inwardly positioned housing wings are also forced in the direction toward the external membranes of the stacked unit. This occurs, for example, when inserting the cartridge into the housing of the humidifier. The housing wings extend parallel to the membranes and support the membranes that are located externally in the stacked unit, respectively.

According to still another expedient embodiment, a supporting element extends transversely to the membrane plane through the stacked unit and lends additional stability to the stacked unit. The supporting element is embodied in particular cylindrical and passes through cutouts in the membranes and optionally in the spacers. The supporting element can be connected optionally with the membranes and/or the support members; however, an embodiment is possible also in which the supporting element is passing, without connection through the cutouts in the membranes, passing through the spacers.

According to an expedient further embodiment, at least two supporting elements are guided transverse to the membranes through the stacked unit and the supporting elements are spaced apart from each other. Advantageously, the supporting elements are located in the area of opposite end faces of the stacked unit. By means of the supporting elements, the stacked unit can be supported, if necessary, in the mounted state within the housing of the humidifier; this has the advantage, that longitudinal forces which act parallel to the membrane plane in the stacked unit can be transmitted via the supporting elements onto the housing of the humidifier. In particular when, by temperature and/or humidity changes, the expansion of the membrane changes, forces can originate in the membranes which, without supporting elements, cause shrinking or enlargement of the membrane; such length changes are at least reduced by the supporting elements and warping of the membranes is prevented.

The supporting element can be embodied as a supporting sleeve in which a bolt is slidably guided. This bolt, preferably one bolt at opposite end faces of the supporting sleeve, respectively, is advantageously force-loaded by a spring element in the direction of a position in which it is projecting from the supporting sleeve; the spring element is also received in the supporting sleeve. Receiving openings for the bolts are provided in the inner housing wall of the housing of the humidifier. The bolts can lock in these openings when the cartridge is inserted into the housing so that a positive locking action of the cartridge in the housing of the humidifier is provided. In order to remove the cartridge, the bolts can be pushed against the force of the spring elements acting on the bolts into the supporting sleeve so that the bolts will be released from the receiving openings in the inner housing wall and the positive locking action is released.

BRIEF DESCRIPTION OF THE DRAWINGS

Further advantages and expedient embodiments can be taken from the claims, the description and the drawings.

FIG. 7 illustrates a first method step of producing the stacked unit;

FIG. 8 illustrates a second method step of producing the stacked unit;

FIG. 9 illustrates a third method step of producing the stacked unit; and

FIG. 10 illustrates a fourth method step of producing the stacked unit.

In the Figures, the same components are provided with the same reference characters.

DESCRIPTION OF PREFERRED EMBODIMENTS

Figure 1:
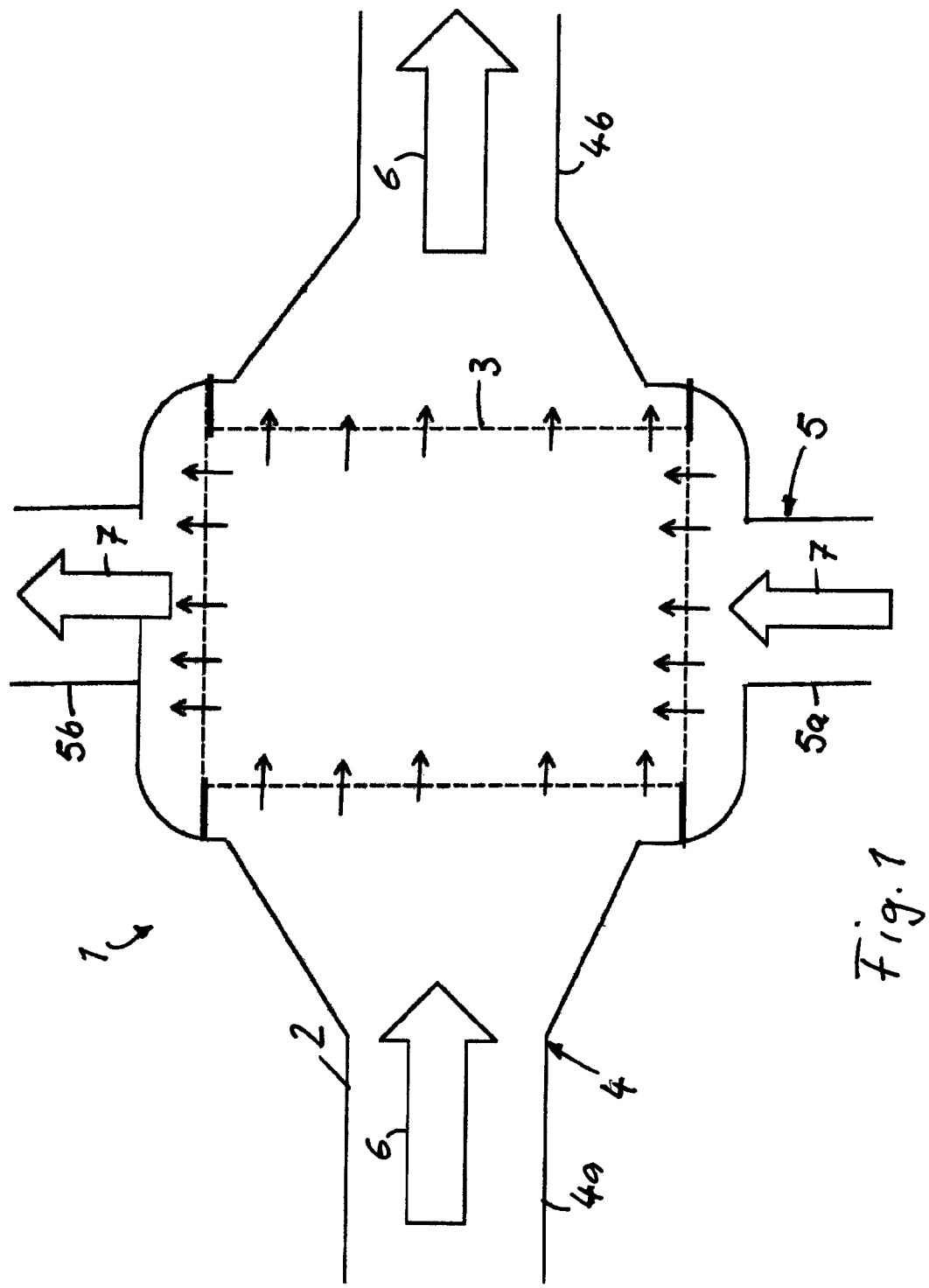
FIG. 1 shows a humidifier for a fuel cell with a cartridge that is inserted into a housing and that comprises several water-permeable membranes arranged in parallel to each other.

In FIG. 1, a humidifier 1 for a fuel cell is shown through which the fuel cell is supplied with fresh air that has a minimum moisture contents and that is enriched with moisture. The humidifier 1 comprises an exchangeable cartridge 3 that is inserted into a housing 2. The cartridge 3 serves to transfer moisture that is contained in an exhaust gas flow to a dry fresh airflow that is supplied to the fuel cell. The cartridge 3 comprises a stacked unit with a plurality of stacked water-permeable membranes.

The housing 2 of the humidifier 1 is provided with a fresh air passage 4 via which ambient air is supplied as fresh air. The fresh air passage 4 comprises a supply segment 4a upstream of the cartridge 3 as well as a discharge segment 4b downstream of the cartridge 3.

Positioned at a 90° angle relative to the fresh air passage 4, the housing 2 is provided with an exhaust gas passage 5 through which the exhaust gases of the fuel cell which are enriched with moisture are passed through the cartridge. The exhaust gas passage 5 comprises a supply segment 5a upstream of the cartridge 3 and a discharge segment 5b downstream of the cartridge 3.

The fresh airflow 6 and the exhaust gas flow 7 cross each other in accordance with the orientation of the passages 4 and 5 at a 90° angle, however, the airflows 6 and 7 are separated from each other within the cartridge 3 by the water-permeable membranes; these membranes permit only water transfer from the exhaust gas flow 7 loaded with high moisture contents to the dry fresh airflow 6.

Figure 3:
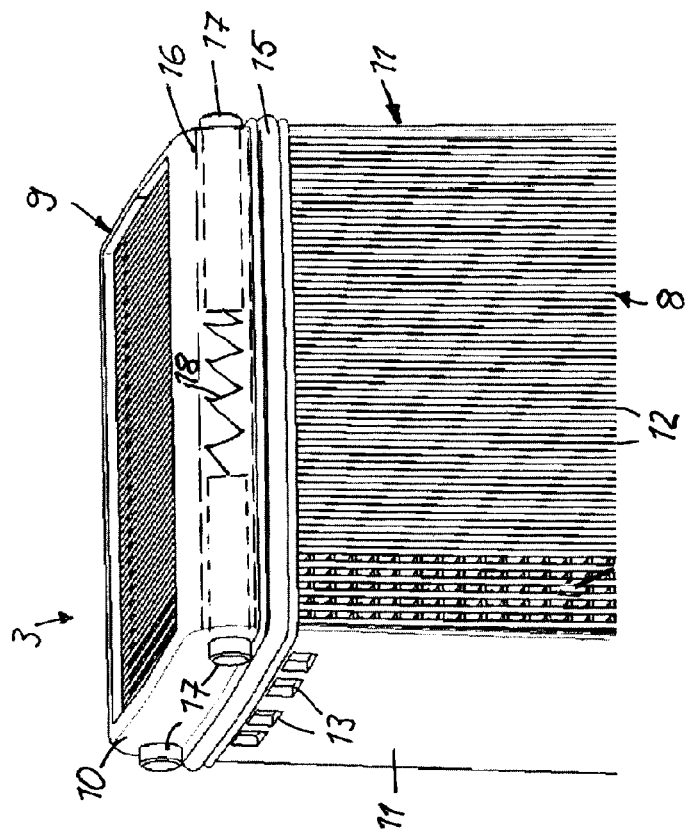
FIG. 3 shows a detail view of the end face area of the cartridge.
Figure 2:
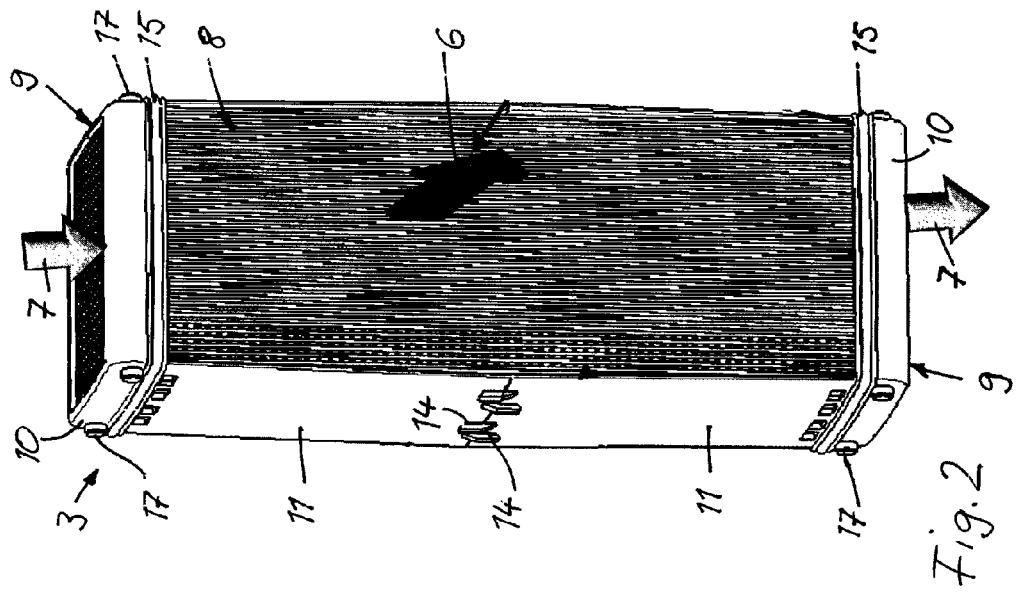
FIG. 2 shows a cartridge in perspective view.
Figure 4:
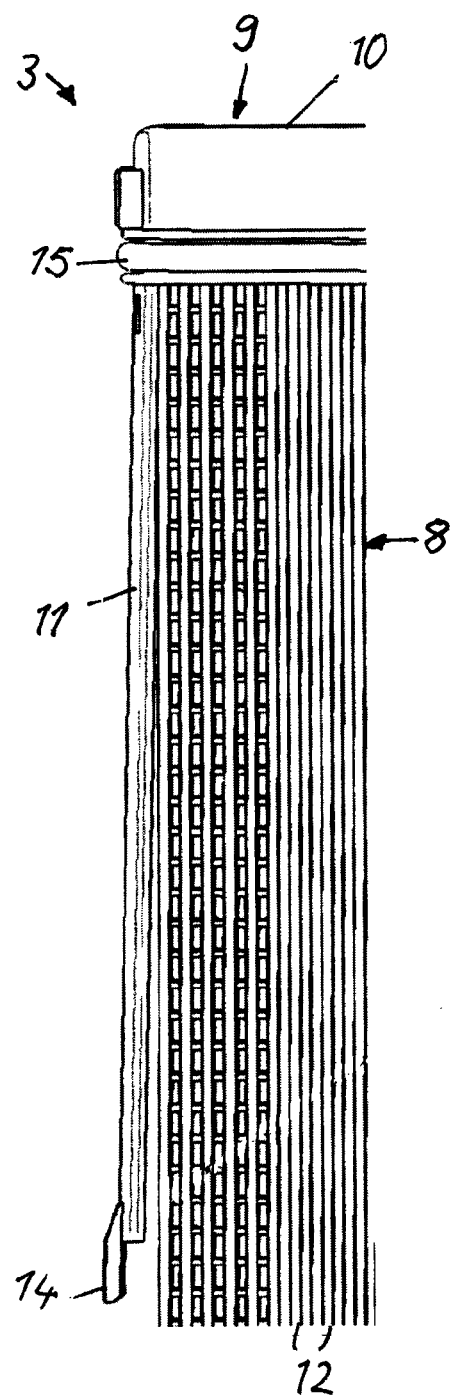
FIG. 4 shows a further representation of a cartridge with a housing sealing frame.

FIG. 2 shows a cartridge 3 in perspective individual view; FIGS. 3 and 4 show details of the cartridge 3, respectively. The cartridge 3 comprises a stacked unit 8 with a plurality of individual membranes 12 that are embodied to be water-permeable, respectively, but do not permit air to pass through, and are arranged in the stacked unit 8 parallel to each other and at a spacing to each other. Flow spaces or passages extend between two neighboring membranes 12, respectively, for allowing the fresh airflow 6 as well as the exhaust gas flow 7 to pass through.

The cartridge 3 comprises further a housing sealing frame 9 that comprises a housing cover 10 in the form of a circumferential frame to be placed onto the end face of the stacked unit, which enables inflow and deflection of the exhaust gas flow 7, and two housing wings 11 which rest at the external membranes, respectively. The housing sealing frame 9 has approximately U shape wherein the two housing wings 11 form the legs of the U shape. The stacked unit 8 is enclosed by two housing sealing frames 9 which are arranged on opposite end faces of the stacked unit 8.

As shown in particular in FIG. 4, the housing wings 11 can be pivoted outwardly at least slightly about their joint-like connecting segment to the housing cover 10 arranged at the end face of the stacked unit 8.

In the area of the connecting segment between the housing wing 11 and the housing cover 10, a series of cutouts 13 is introduced into the housing wing 11; these cutouts weaken the structure so that the at least slight outward pivot movement of the housing wings 11 is enabled. The same function can be provided, for example, also by means of a film hinge.

On the side that is facing away from the housing cover 10, the housing wing has locking segments 14 that are projecting away from the wing ends. The locking segments 14 of opposite housing wings interlock during assembly so that, by pressing a housing wing against the neighboring membrane, the second housing wing is pressed also against the membrane on the same side of the stacked unit; several of the locking segments 14 may be arranged on the wind ends of the housing wings 11. For example, when the cartridge 3 is inserted into the housing 2 of the humidifier 1, the angular extending housing wing 11 contacts the inner housing wall and is pressed against the membranes and entrains at the same time the second housing wing.

On the housing cover 10 there is a circumferential U-shaped sealing ring 15 that is arranged adjacent to the housing wings 11. The sealing ring 15 is positioned in the inserted state on the inner housing wall of the housing 2 of the humidifier and separates fluid-tightly the fresh airflow from the exhaust gas flow.

Though the housing cover 10 of the housing sealing frame 9, in transverse direction, i.e., transverse to the plane of the membrane 12, a supporting element 16 in the form of a supporting sleeve is extending. For each housing cover 10, two supporting sleeves 16 are provided at the edges that are parallel and spaced apart from each other. In each supporting sleeve 16 two bolts 17 are slideably arranged and are supported on each other by means of a spring element 18 disposed in the supporting sleeve 16. The spring element 18 loads the bolts 17 with a force that drives the bolts out of the sleeve so that the bolts 17, without any action from the outside, project past the ends of the supporting sleeve 16.

For assembly, the bolts 17 are pushed against the force of the spring element 18 into the sleeve 16 and the cartridge 3 is inserted into the housing 2; the inner housing wall has receiving openings that serve for receiving the bolts 17. As soon as the receiving openings are reached, the bolts 17 can engage and lock in the receiving openings as a result of the force of the spring element 18.

The supporting sleeves 16 stabilize the stacked unit 8. Moreover, a force transmission is possible in the mounted state between housing 2 and bolts 17 as well as supporting sleeves 16. Moreover, the supporting sleeves 16 passing through the membranes provide also that in case of shrinking or enlargement of the membrane, for example, by temperature or humidity fluctuations, tensile forces are absorbed by the supporting sleeves 16 and the bolts 17 and, moreover, too big a warping action of the membranes is prevented.

Figure 6:
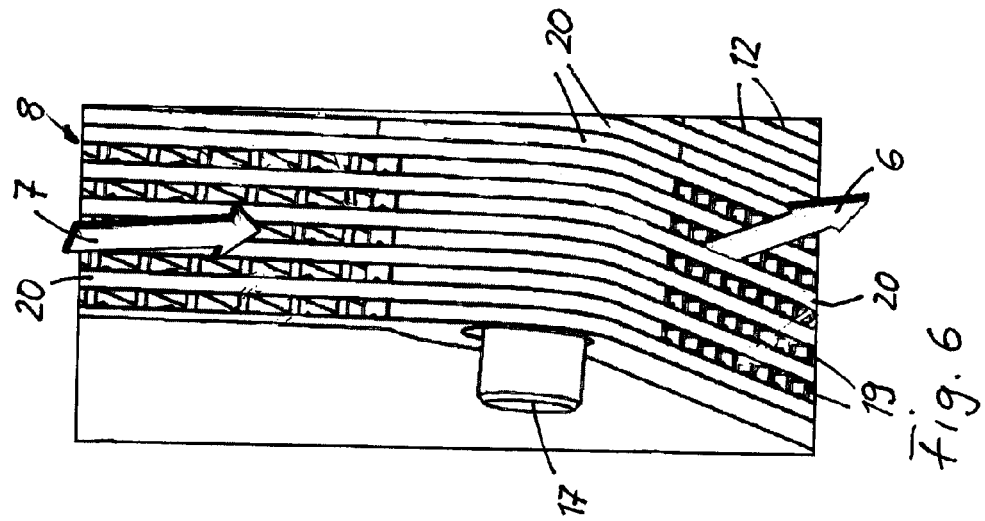
FIG. 6 shows a stacked unit, which is a component of the cartridge, without showing the housing sealing frame.
Figure 5:
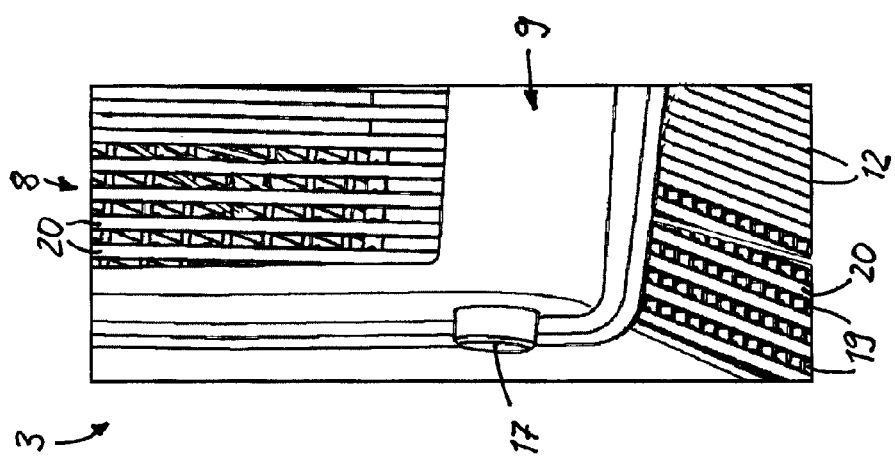
FIG. 5 is a perspective view of the cartridge from the corner area.

As can be seen in FIGS. 5 and 6, between two neighboring membranes 12, respectively, there are spacers 19 in the form of a spacer lattice which at least roughly extends across the whole surface area of the membrane 12. Moreover, a sealant 20 is applied at the end faces of the inflow and outflow sides of the membranes that pressure-tightly seals the flow spaces positioned between the neighboring membranes at the end faces, respectively. The sealant 20 is embodied preferably as an adhesive material glued to the end faces of the membrane.

At each end face of the stacked unit 8 every other intermediate space between neighboring membranes 12 is closed with a sealant 20 at the edges. With respect to the fresh airflow 6 and the exhaust gas flow 7 that are passing through the stacked unit 8 at a 90° angle relative to each other, the sealant 20 is arranged alternately between the membranes 12. In this way, the intermediate space between two membranes 12 is closed for the fresh airflow 6 at the edges by sealant 20 while in the same intermediate space no sealant 20 is provided for the exhaust gas flow 7. In the next intermediate space between neighboring membranes, in the edge area of the fresh airflow 6 no sealant is present while in the same intermediate space in the edge area of the exhaust gas flow 7 such sealant 20 is provided.

As shown in FIG. 6, a sealant 20 can be arranged in the corner area of the stacked unit 8 in each intermediate space between the membranes 12. In this way, it is ensured that the stacked unit 8 is flowed through straight either according to arrow 6 or according to arrow 7 by the respective airflow.

In the FIGS. 7 to 10, the manufacture of a stacked unit is shown. First, according to FIG. 7, on a first membrane 12 in the edge area to the left and to the right a sealant 20 is applied, respectively, which has additionally an adhesive function. For an improved adhesion, it can be expedient to first etch the edge area before applying the sealant or to subject the edge area to a plasma treatment.

Onto the membrane 12, the spacer lattice 19 is placed which extends, if necessary, into the edge area so that by application of the sealant 20 also the edge area of the spacer lattice 19 is filled with sealant. In the first layer according to FIGS. 7 and 8 the spacer lattice 19 has a structure with longitudinal webs that extend parallel with the sealant 20 at the edge segments so that a defined flow direction is predetermined parallel to the sealant 20.

In FIG. 8, a second membrane 12 is placed onto the spacer lattice 19 and the sealant 20 is applied to the edge segments. The second membrane 12 is fixed by the adhesive sealant 20.

The membranes 12 may be provided in the corner areas with cutouts 21 which serve for receiving the sleeve-shaped supporting element 16.

In FIGS. 9 and 10, a further step is shown for constructing a stacked unit. Onto the upper membrane 12, sealant 20 is applied to opposite end faces in the edge area, but displaced by 90° relative to the first step according to FIG. 7. Onto the upper membrane 12 another spacer lattice 19 is placed which is provided with transverse webs to allow flow in transverse direction. The spacer lattice 19 is covered in the edge area by the sealant 20.

According to FIG. 10, another membrane 12 is placed on top which is fixed by the sealant 20 applied to the end faces.

While specific embodiments of the invention have been shown and described in detail to illustrate the inventive principles, it will be understood that the invention may be embodied otherwise without departing from such principles.

What is claimed is:

1. A humidifier for a fuel cell, the humidifier comprising:
   at least one stacked unit comprising several water-permeable membranes that are stacked in a parallel orientation parallel to each other and spaced apart from each other,
   wherein each stacked membrane has four lateral outer edges, the lateral outer edges forming end faces of the membrane;
   wherein between two neighboring membranes a flow space is formed, respectively;
   the at least one stacked unit comprising a sealant disposed at edges of the membranes,
   wherein the sealant seals fluid-tightly the flow spaces, respectively;
   wherein each of said two neighboring water-permeable membranes each include
      a first membrane edge area arranged at and extending along a first membrane outer edge of the four lateral membrane outer edges, the first edge area beginning at a first end face of the first membrane and extending inwardly on the membrane;
      a second membrane edge area arranged at and extending along an opposing second membrane edge of the four lateral membrane outer edges, the second edge area beginning at a second end face of the second membrane and extending inwardly on the membrane;
   wherein the first membrane edge area of the first neighboring membrane faces the first membrane edge area of the second neighboring membrane;
   wherein the second membrane edge area of the first neighboring membrane faces the second membrane edge area of the second neighboring membrane;
   wherein the sealant comprises:
      a first adhesive sealant member arranged at and facing first end faces of the first and second neighboring membranes, the first sealant member having a first side secured onto the first membrane edge area of the first neighboring membrane and having an opposing side of the first sealant member secured onto the first membrane edge area of the second neighboring membrane;
      a second adhesive sealant member spaced laterally apart from the first adhesive sealant member, the second adhesive sealant member arranged at facing second end faces of the first and second neighboring membranes, the second sealant member having a first side secured onto the second membrane edge area of the first neighboring membrane and an opposing side secured onto the second membrane edge area of the second neighboring membrane;
   wherein each adhesive sealant member is secured to, contacts on and sealably closes onto a respective lateral outer edge of the first membrane as well as secured to, contacts on and sealably closes onto a respective lateral outer edge of the second membrane, completely sealing space between the respective lateral outer edges of the first and second membranes;
   wherein the first and second adhesive sealant members each secure onto, cover and sealably close space between respective facing membrane edge areas of the first and second neighboring membranes;
   wherein the first and second adhesive sealant members have inherent stiffness in a mounted state to bear forces and act as support spacers, spacing apart and supporting the first and second membranes in the stacked unit;
   wherein opposing end faces of the two neighboring membranes positioned at a 90° angle relative to the first and second end faces are not closed by sealant;
   wherein the each sealant member has sufficiently high stiffness in the mounted state to also act as adhesive spacers between neighboring membranes, spacing immediately neighboring membranes apart such that only the adhesive spacer members are used to hold membrane spacing.

2. The humidifier according to claim 1, wherein the sealant is thixotropic.

3. The humidifier according to claim 1, wherein in the stacked unit the sealant members are displaced by 90 degrees in the successively arranged membranes, respectively.

4. The humidifier according to claim 1, comprising spacers that are arranged in the flow spaces, respectively.

5. The humidifier according to claim 4, wherein the spacers each are a spacer lattice.

6. The humidifier according to claim 1, further comprising a first housing sealing frame in which the stacked unit is received.

7. The humidifier according to claim 6, wherein the first housing sealing frame comprises
   a housing cover and
   two lateral housing wings connected to the housing cover,
      wherein the housing cover is positioned at an end face of the stacked unit.

8. The humidifier according to claim 6, further comprising a second housing sealing frame,
   wherein the first and second housing sealing frames each comprise
      a housing cover and
      two lateral housing wings connected to the housing cover,
   wherein the housing cover of the first housing sealing frame is positioned at an end face of the stacked unit and
   the housing cover of the second housing sealing frame is positioned at a second end face of the stacked,
   the second end face positioned opposite the first end face.

9. The humidifier according to claim 8, wherein the housing cover of the first housing sealing frame has a circumferential sealing ring and
   the housing cover of the second housing sealing frame has a circumferential sealing ring.

10. The humidifier according to claim 7, wherein the first housing cover has a circumferential sealing ring.

11. The humidifier according to claim 1, comprising a supporting element extending through the membranes in a direction transverse to the parallel orientation of the membranes.

12. The humidifier according to claim 11, wherein several of the supporting element are provided that extend at opposed end faces of the membranes through the membranes.

13. The humidifier according to claim 11, wherein the supporting element is a supporting sleeve, wherein a bolt is slideably guided in the supporting sleeve.

14. The humidifier according to claim 1, comprising a housing in which the at least one stacked unit is received.

15. A fuel cell with a humidifier according to claim 1.

* * * * *